United States Patent
Aigami

[11] Patent Number: 6,155,298
[45] Date of Patent: Dec. 5, 2000

[54] VALVE DEVICE FOR MOLTEN METAL

[75] Inventor: Kyoji Aigami, Kanagawa, Japan

[73] Assignees: Shigeru Fukumaru; Shinkenko Co., both of Atsugi, Japan

[21] Appl. No.: 09/223,715

[22] Filed: Dec. 31, 1998

[30] Foreign Application Priority Data

Feb. 26, 1998 [JP] Japan .................................. 10-045544

[51] Int. Cl.$^7$ ................................................ F16K 11/083
[52] U.S. Cl. ..................................... 137/625.47; 251/181
[58] Field of Search .......................... 137/625.46, 625.47, 137/375; 251/181

[56] References Cited

U.S. PATENT DOCUMENTS

| | | | |
|---|---|---|---|
| 1,965,069 | 7/1934 | Cramer .................................... | 251/181 |
| 3,157,201 | 11/1964 | Littmann ................................. | 251/181 |
| 4,021,190 | 5/1977 | Dickson .................................. | 431/280 |
| 4,898,669 | 2/1990 | Tesio ...................................... | 210/232 |
| 4,964,436 | 10/1990 | Hein ..................................... | 137/625.47 |
| 5,590,681 | 1/1997 | Schaefer et al. ......................... | 137/375 |

*Primary Examiner*—John Fox
*Attorney, Agent, or Firm*—Wenderoth, Lind & Ponack, L.L.P.

[57] ABSTRACT

A valve device for a fluid such as molten metals, which permits reliable, accurate and very easy control of the flow of molten metal as well as the direction in which the molten metal is to flow. The valve device includes a valve body (6) and a valve seat (8) for accepting the valve body (6). The valve body (6) and the valve seat (8) are adapted to engage each other under an applied pressure so that the two elements can slide relative to each other. Specifically, the valve body (6) has a slanted surface and the valve seat (8) has a slanted surface so that the valve body (6) and the valve seat (8) slidably engage each other through the respective slanted surfaces. The slanted surface on the valve seat (8) has a plurality of openings (15a, 15b, 15c) which communicate with a plurality of fluid passages (11, 12, 13) within and through the valve seat (8). Also, the slanted surface on the valve body (6) has two or more openings (14a, 14b) that communicate with a plurality of fluid passages (26) within and through the valve body. Any one of the openings (15a, 15b, 15c) on the slanted surface of the valve seat (8) may be aligned with any one of the openings (14a, 14b) for completing a given fluid passage within the valve device by allowing the valve body (6) and the valve seat (8) to slide relative to each other with the respective slanted surfaces engaging each other under the applied pressure.

17 Claims, 7 Drawing Sheets

VALVE DEVICE FOR MOLTEN METAL

BACKGROUND OF THE INVENTION

1. Field of the Invention

The present invention relates to a valve device for controlling the flow of a fluid, so that the fluid can flow in a particular direction. More particularly, the present invention relates to a valve device for a fluid, such as molten metals, that may be used to control the flow of molten metal usually heated at high temperatures such as 1000 C. degrees or more, so that the fluid can flow in a particular direction.

2. Description of the Prior Art

Figure 9:
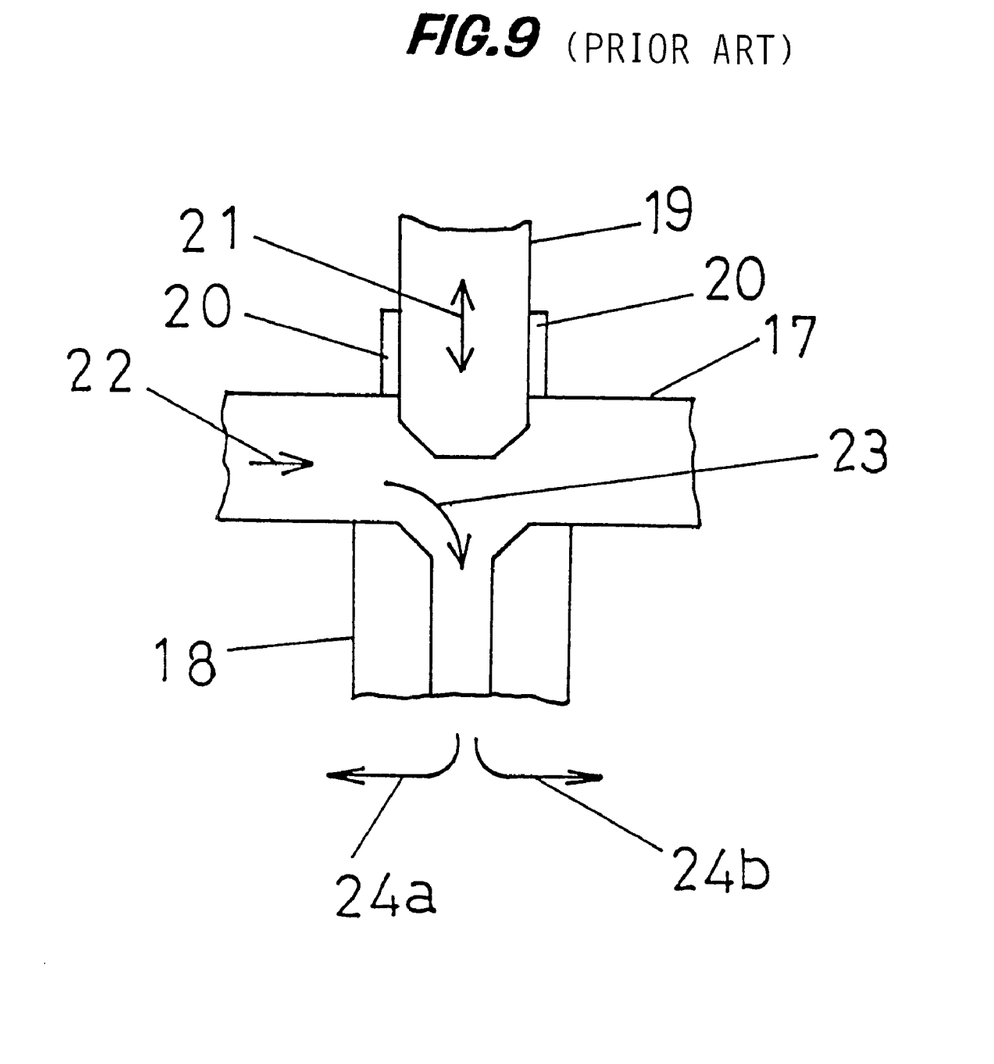
FIG. 9 is a sectional view showing the prior art valve device used in transporting molten metals.

Conventionally, as means for controlling the flow of molten metal usually heated at 1000 C. degrees or more so that the molten metal can flow in a particular direction, the valve device such as the one shown in FIG. 9 is employed. As shown, this valve device includes a fluid pipe 17 equipped with a sealing 20 on one lateral side thereof, and a valve body 19 that is fitted into the fluid pipe 17 on the lateral side so that it can be moved into or away from the fluid pipe 17 transversely thereof. By moving the valve body 19 into or away from the fluid pipe 17 transversely thereof in the direction of a double arrow 21, the valve device is operated so that the flow of the molten metal coming through the fluid pipe 17 in the direction of an arrow 22 may be controlled so that the molten metal can flow toward the fluid pipe 18 as indicated by an arrow 23 and then in the direction of arrows 24a, 24b, for example.

According to the prior art valve device described above, the valve body makes a sliding contact or pressure contact against the internal wall of the fluid pipe, thereby sandwiching molten metal between the valve body and the internal walls of the fluid pipe. Thus, any impurities present in the molten metal may damage the surface of the valve body upon making the sliding or pressure contact against the internal walls of the fluid pipe, and may affect the anticorrosiveness or durability of the valve body.

Also, according to the prior art valve device, when the flow of the molten metal is suspended and remains motionless, the molten metal becomes solidified, which may the attach to the valve body and other parts. This may make the valve device inoperative so that it is difficult to restart the valve device.

In transporting the molten metal from a blast furnace, holding furnace or the like to a particular destination, it is desired to develop a valve device that can control the flow of molten metal accurately and reliably so that the flow can occur in a particular direction, and that can save the labor and time required to remove any attached solidified metal, at the time when the valve device is to be restarted after the transport of the molten metal flow is suspended.

SUMMARY OF THE INVENTION

The present invention solves the above described problems of the prior art valve device, by providing a valve device that includes a valve body having a slanted surface and a valve seat for accepting the said valve body and having a slanted surface matching the slanted surface of the valve body. Each of the slanted surfaces has openings that communicate with fluid passages, wherein the valve body and the valve seat engage each other at their respective slanted surfaces under the applied pressure so that the one can slide relative to the other.

Specifically, a valve device proposed by the present invention is designed for use with a fluid such as molten metals, and includes a valve body and a valve seat for accepting the valve body. The valve body has a slanted surface and the valve seat has a slanted surface matching the slanted surface of the valve body, such that the valve body and the valve seat engage each other at the respective slanted surfaces under the applied pressure and the one can slide relative to the other. More specifically, the slanted surface of the valve seat has a plurality of openings each of which communicates with each respective one of fluid passages within and through the valve seat, and the slanted surfaces of the valve body has a plurality of openings that communicate with one or more fluid passages within and through the valve body. Any particular openings on the slanted surface of the valve seat may be aligned with any particular openings on the slanted surface of the valve body, by sliding either of the valve body and valve seat relative to the other with the valve body and the valve seat engaging each other at the respective slanted surfaces under the applied pressure.

A valve device according to the present invention may be described as follows other than the before described. A valve device according to the present invention is designed for use with a fluid such as molten metals, and includes a valve body and a valve seat for accepting the valve body. The valve body has a slanted surface and the valve seat has a slanted surface matching the slanted surface of the valve body, such that the valve body and the valve seat engage each other at the respective slanted surfaces under the applied pressure and the one can slide relative to the other. More specifically, the slanted surface of the valve seat has a plurality of openings each of which communicates with each respective one of a plurality of fluid passages within and through the valve seat, and the slanted surface of the valve body has a plurality of openings that communicate with one or more fluid passages within and through the valve body. A fluid that comes into the valve seat through any of its fluid passages can be connected through the fluid passage within the valve body to any of remaining fluid passages within the valve seat, and the fluid flows in a different direction from which the fluid came into the valve seat.

In the valve device described above, the fluid passages within the valve seat may be provided to have a down slope from the valve seat toward the outside thereof.

A valve device according to the present invention may be further described as follows other than the before mentioned descriptions. A valve device proposed by the present invention is designed for use with a fluid such as molten metals, and includes a valve body having a conically formed portion at an end thereof. The conical portion has a plurality of openings spaced at regular intervals, at least two or more of which communicate with each other through a fluid passage within the valve body. Also a valve seat is provided for accepting the valve body and has a plurality of fluid passages therein. The valve seat has a recess for accepting the conical portion of the valve body and a plurality of openings that is at least one more than those on the conical portion of the valve body, such that the openings on the recess of the valve seat are arranged at regular intervals around the peripheral wall of the recess and communicate with respective fluid passages within the valve seat. The conical portion of the valve body may be pressed against the recess of the valve seat to allow it to engage the recess on the valve seat so that the valve body can slide relative to the valve seat. In this valve device, the fluid passages within the valve seat may also be provided with a down slope from the valve seat toward the outside thereof.

Figure 1:
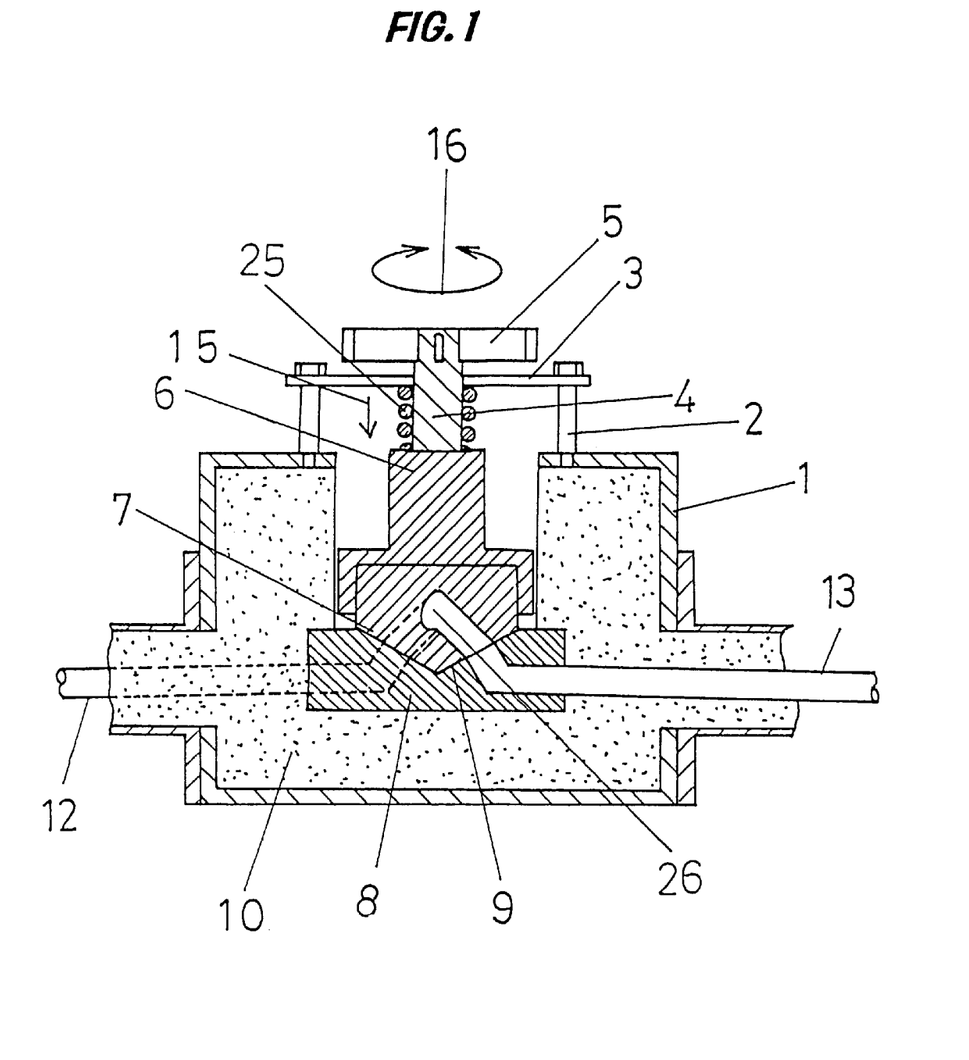
FIG. 1 is a sectional view showing a valve device according to one embodiment of the present invention.
Figure 2:
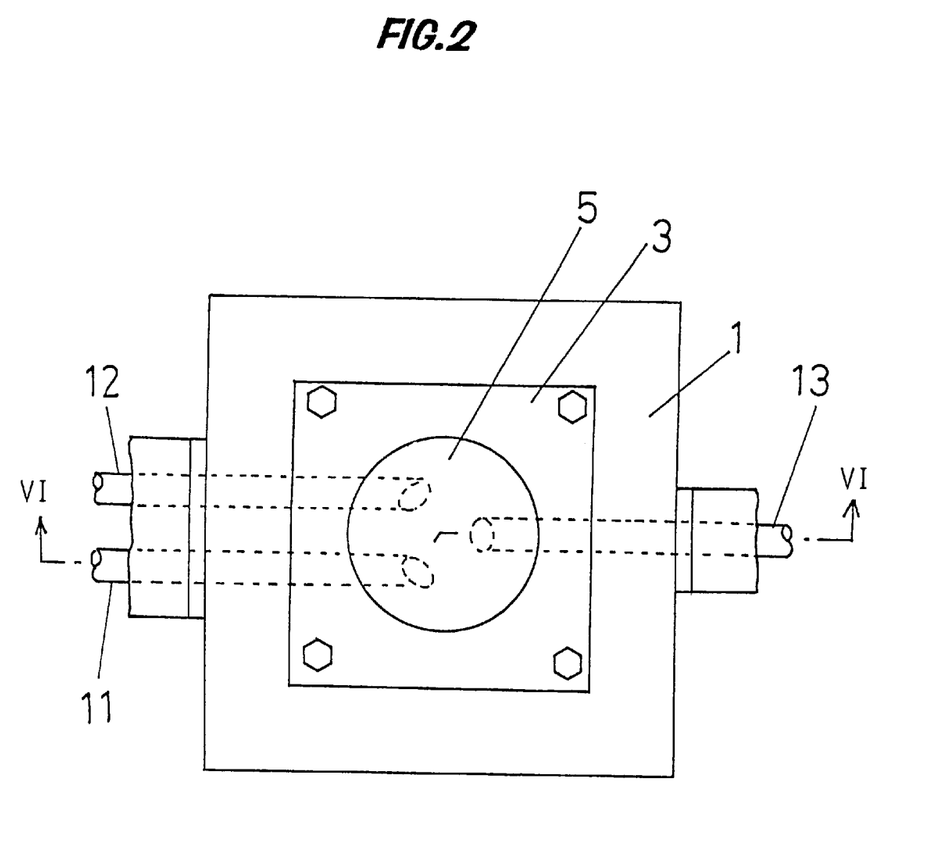
FIG. 2 is a plan view of the embodiment of FIG. 1.
Figure 3:
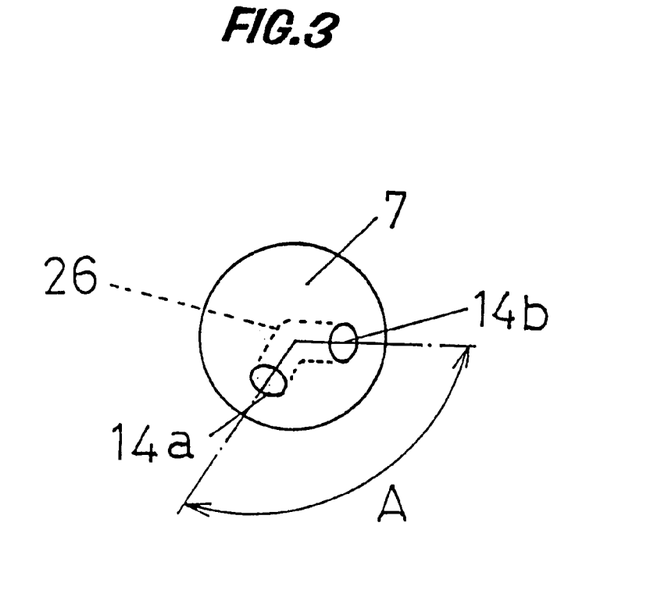
FIG. 3 is a bottom view showing a valve body in the embodiment of FIG. 1.

Referring first to FIGS. 1 through 3, a valve device according to the present invention includes a valve body 6 having a conically formed portion 7 which will be referred to simply as a conical portion 7, and a valve seat 8 for accepting the valve body 6 and having a recess 9 wherein the conical portion 7 is always placed under the pressure applied to the valve body 6 by the action of a spring 25 so that the conical portion 7 can engage the recess 9 slidably relative to the recess 9. The conical portion 7 is formed to present a slanted surface which has openings 14a, 14b spaced at regular intervals which communicate with each other by means of a fluid passage 26 within and through the valve body 6. On the other hand, the recess 9 on the valve seat 8 is formed to present a slanted surface which may be engaged by the slanted surface of the conical portion 7 on the valve body 6 and has openings 15a, 15b, 15c spaced at regular intervals, each of which communicates with each respective one of fluid passages 11, 12, 13 within and through the valve seat 8, respectively.

In operation, the valve body 6 is rotated to cause its conical portion 7 to slide on the recess 9 on the valve seat 8, with the slanted surface of the conical portion 7 engaging the slanted surface of the recess 9, so that any two of the openings 15a, 15b, 15c can be aligned with the openings 14a, 14b. For example, the opening 15a may be aligned with the opening 14a and the opening 15c may be aligned with the opening 14b. Thus, a fluid that flows through the fluid passage 11 within the valve seat 8 may go through the openings 15a and 14a into the fluid passage 26 within the valve body 6 and then through the openings 14b and 15c into the fluid passage 13 within the valve seat 8.

A fluid, in the form of molten metal heated at high temperatures, that flows through the fluid passage 11 within the valve seat 8 will have reached the opening 15a and have made contact with the slanted surface of the conical portion 7 of the valve body 6 before the alignment of the opening 15a with the opening 14a, that is, the alignment of the opening 15c with the opening 14b begins to occur, but as the conical portion 7 on the valve body 6 and the recess 9 on the valve seat 8 engage each other along the respective slanted surfaces closely under the applied pressure, the fluid (molten metal at high temperatures) that has reached the opening 15a will never enter the space between the conical portion 7 and the recess 9.

Figure 5:
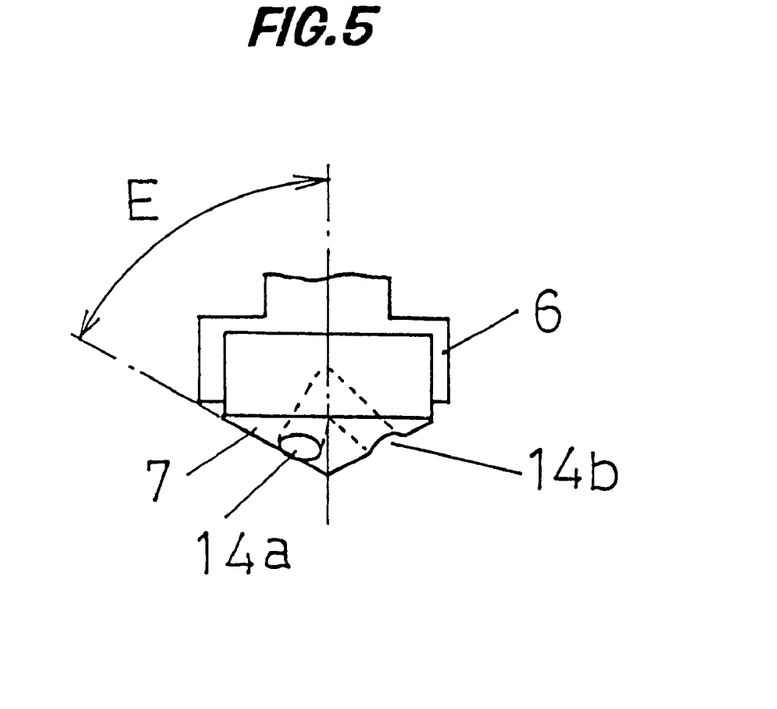
FIG. 5 is a front view of the valve body in FIG. 3.

The results of the experiment effected by the inventor of the current application show that it is preferable to provide the conical portion 7 and the recess 9 with a slanted surface, respectively, that should have an inclined angle range of between 30 degrees and 60 degrees, as expressed by "E" in FIG. 5. If the inclined angle "E" as expressed in FIG. 5 is less than 30 degrees or more than 60 degrees, it is shown that the fluid (molten metal at high temperatures) that has reached the opening 15a may tend to enter the joint between the conical portion 7 and the recess 9, which is not desirable.

It may be understood from the foregoing description that the valve device according to the present invention allows the valve body 6 and the valve seat 8 to engage each other along the respective slanted surfaces closely but slidably under the applied pressure, thus preventing entry of any part of the molten metal into the space between the valve body 6 and the valve seat 8.

If some part of the molten metal may enter the space between the valve body 6 and valve seat 8, there is a risk that any impurities contained in such part of the molten metal would damage the areas where the valve body 6 and the valve seat 8 engage each other, and would therefore affect the anticorrosiveness or durability of the valve body 6 and valve seat 8, when the surfaces of the valve body 6 and valve seat 8 engaging each other and sandwiching the molten metal therebetween are slided relative to each other. The present invention will avoid such situation as the before described.

According to the present invention, furthermore, even if the surfaces (slanted surfaces) of the valve body 6 and valve seat 8 engaging each other may be damaged by sliding them relative to each other, there is no risk that some part of the molten metal would enter the damaged area because the two elements engage each other closely under the applied pressure.

Furthermore, as described above, when the fluid (molten metal at high temperatures) has come into the valve seat 8 through the fluid passage connected to one side of the valve seat 8, and is flowing through the fluid passage 26 within the valve body 6 toward the other side thereof, both the valve body 6 and valve seat 8 are always heated by the fluid (molten metal at high temperatures). This prevents any part of the molten metal from solidifying and attaching to the valve body etc.

The valve device of the present invention may be altered such that the valve seat 8 may have a built-in (buried) heater element, such as any known heater coils or the like, so that it can be kept hot. In this case, when the flow of the fluid (molten metal at high temperatures) that has come into the valve seat 8 and is now in contact with the slanted surface of the conical portion 7 through any opening on the recess 9 is suspended, there is no risk that such molten metal would be solidified and attached to the valve body, etc.

According to the present invention, the flow of a molten metal that is kept hot at high temperatures such as 1000 C. degrees or more and the direction in which the molten metal is to flow can be controlled reliably, accurately, and very simply. The valve device of the present invention may be used for a transference of molten metal such as molten aluminum having a high temperatures from 600 C. degrees to 700 C. degrees, or other molten metal heated to 1000 C. degrees or more.

It may be understood from the foregoing description that the valve device according to the present invention may be used for controlling the flow of a fluid such as molten metal that is kept hot at high temperatures, and for controlling the direction in which the fluid is to flow, and includes a valve body and a valve seat that may be operated to engage each other under the applied pressure, and to permit the one to slide relative to the other at the slanted surfaces facing each other so that the fluid passage or passages within and through the valve body can selectively communicate with any particular one or ones of the fluid passages within and through the valve seat, through the respective openings provided on the slanted surfaces of the valve body and the valve seat. Thus, the fluid (molten metal) that flows through those fluid passages is prevented from entering the space between the valve body and the valve seat.

If any part of molten metal enters the space between the valve body and the valve seat, the surfaces (sliding surfaces) of the valve body and valve seat engaging each other would be damaged by any impurities contained in the molten metal, when the one slides relative to the other with such part of the molten metal sandwiched therebetween.

According to the present invention, however, such possible damage can be avoided since the fluid (molten metal) that flows through the fluid passages is prevented from entering the space between the slanted surface of valve body and the respective slanted surface of valve seat, and therefore the anticorrosiveness and durability of the valve body and valve seat cannot be affected.

When the flow of the molten metal is suspended or blocked by the closed openings, according to the present invention, the molten metal will not solidifying and attach to the valve body and valve seat. Thus, the flow can be restarted with no difficulty.

BRIEF DESCRIPTION OF THE DRAWINGS

The present invention is described in further detail by reference to the accompanying drawings, in which:

FIG. 7 (a) to FIG. 7 (f) illustrate the different states of the valve body and the valve seat in which they engage each other at their respective contact surfaces (slanted surfaces), in which FIG. 7 (a) shows that the opening 14a is now aligned with the opening 15a; FIG. 7 (b) shows that the valve body has been rotated counterclockwise, beginning with the state FIG. 7 (a); FIG. 7 (c) shows that the opening 14a is now aligned with the opening 15c; FIG. 7 (d) shows that the valve body has been rotated further counterclockwise, beginning with the state shown in FIG. 7 (c); FIG. 7 (e) shows that the opening 14a is now aligned with the opening 15b; and FIG. 7 (f) shows that the valve body has been rotated further counterclockwise, beginning with the state shown in FIG. 7 (e);

DETAILED DESCRIPTION OF THE INVENTION

Now, several preferred embodiments of the present invention will be described by referring to the accompanying drawings.

Referring to FIG. 1, a valve device according to the present invention includes a valve body 6 and a valve seat 8 for accepting the valve body 6, and is mounted within housing 1. The housing 1 includes vertical support members 2 and a top plate 3 supported by the vertical support members 2. Within the housing 1, there is also a vertical drive spindle 4 that extends through the top plate 3, having one end secured to a rotary handle 5 above the top plate 3 and another end secured to the valve body 6. The vertical drive spindle 4 is loaded with a spring 25 between the top plate 3 and the valve body 6. The valve body 6 includes at the end thereof a conically formed portion 7, which will be referred to simply as the conical portion 7. The valve seat 8 has a recess 9 for accepting or receiving the conical portion 7, and the valve seat 8 is securely supported by a heat insulating material 10 filled within the housing 1. The conical portion 7 of the valve body 6 is adapted to rest on the recess 9 of the valve seat 8. Specifically, the conical portion 7 has a downwardly slanted surface, and the recess 9 has an upwardly slanted surface. Thus, the valve body 6 is always pressed toward the valve seat 8 under the action of the spring 25, as indicated by an arrow 15, so that the downwardly slanted surface of the conical portion 7 can always engage the upwardly slanted surface of the recess 9 under the applied pressure.

Figure 4:
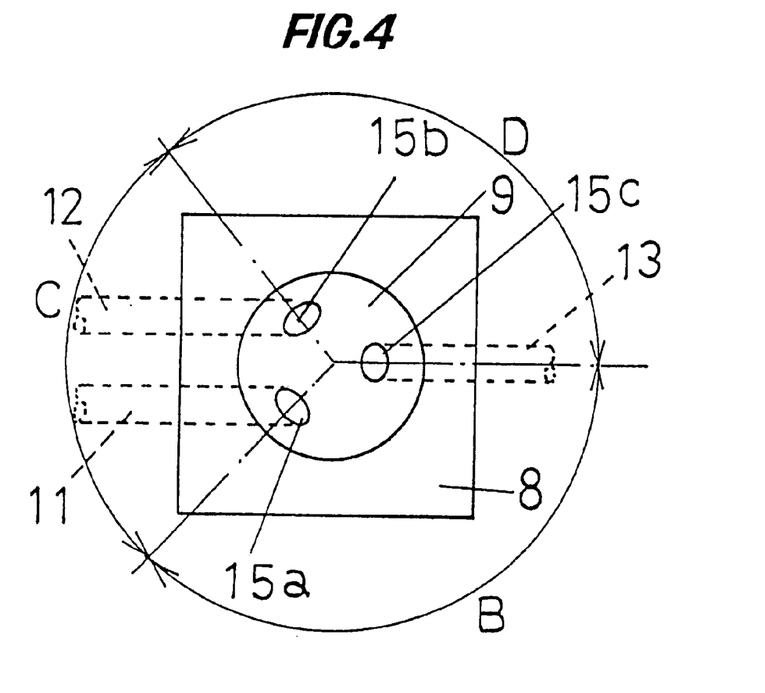
FIG. 4 is a plan view showing a valve seat in the embodiment of FIG. 1.

As shown in FIG. 3, the conical portion 7 of the valve body 6 has openings 14a, 14b which communicate with each other by means of a fluid passage 26 within and through the valve body 6, while as shown in FIG. 4, the slanted surface of the recess 9 of the valve seat 8 has openings 15a, 15b, 15c spaced at regular intervals, each of which communicates with each respective one of fluid passages 11, 12, 13 within and through the valve seat 8. The openings 14a, 14b and the openings 15a, 15b, 15c are provided such that any two adjacent ones of the openings 15a, 15b, 15c can communicate with each other through the connection formed by the opening 14a, the fluid passage 26, and the opening 14b. To this end, each of the angles "A", "B", "C", "D" between the center of openings 14a, 14b and between any two adjacent centers of the openings 15a, 15b, 15c as shown in FIG. 3 and FIG. 4 are set to 120 degrees, and the distance from the center of the circle to the opening is defined to be equal for each of the openings.

Figures 7A, 7B, 7C:
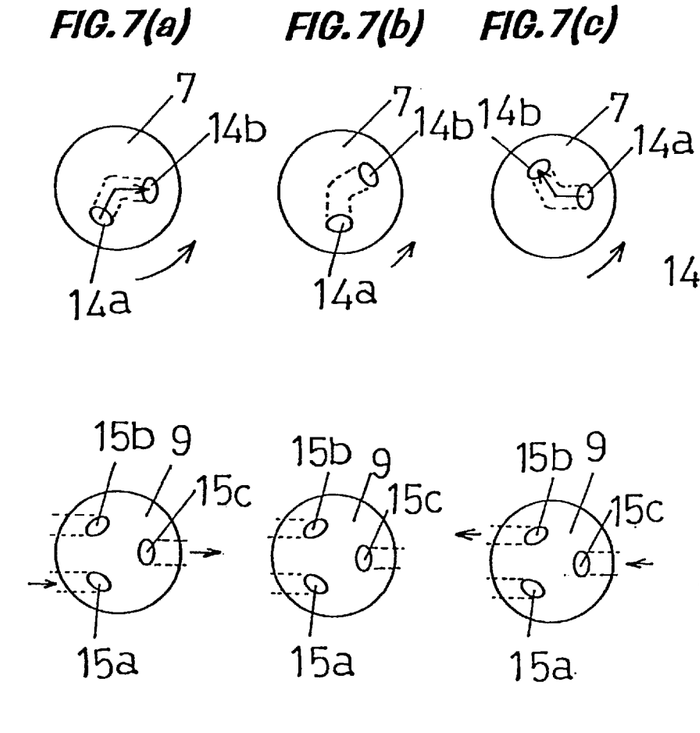
Figures 7D, 7E, 7F:
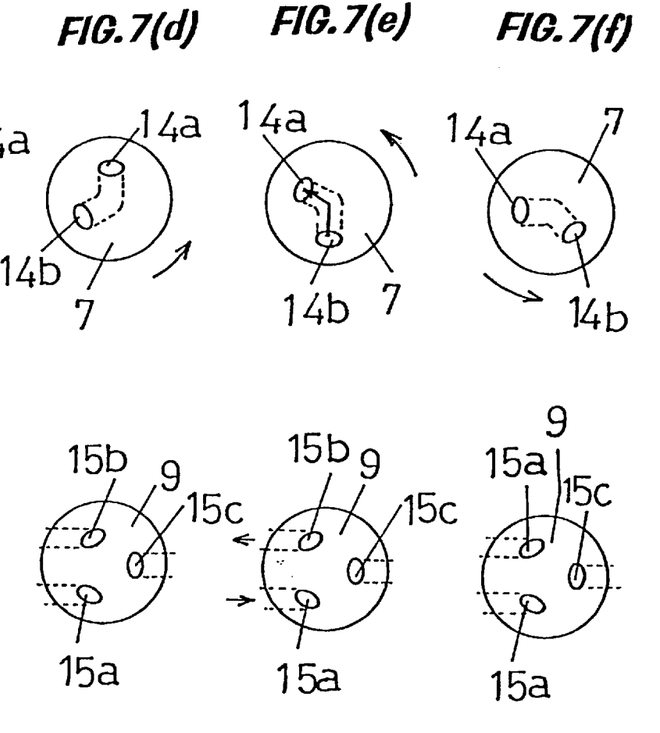

Referring now to FIG. 7 (a) to FIG. 7 (f), an example of the embodiment for controlling the flow of a fluid (molten metal) and then controlling the direction in which the fluid is to flow by using the valve device according to the present invention is described.

Figure 6:
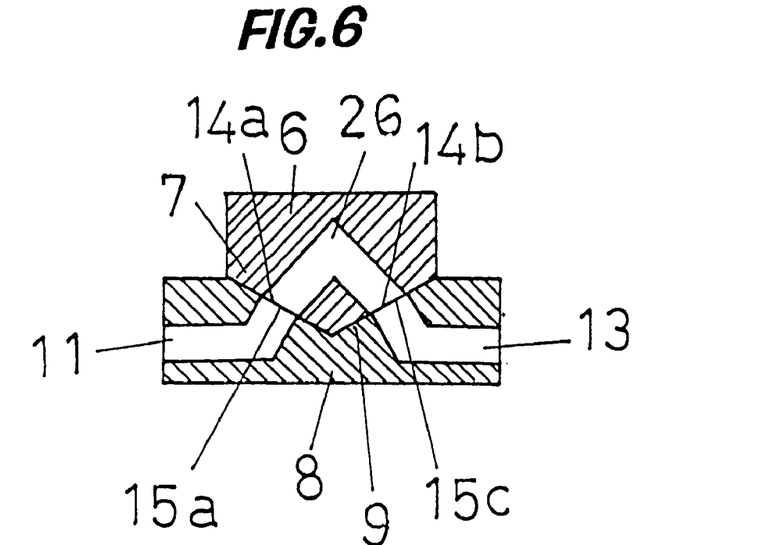
FIG. 6 is a sectional view of the valve body and the valve seat taken along the line 1 in FIG. 2.

In the state shown in FIG. 7 (a), the fluid that comes into the valve seat 8 through the fluid passage 11 is flowing through the opening 15a of the recess 9 of the valve seat 8, going through the opening 14a of the conical portion 7 of the valve body 6 into the fluid passage 26 within the valve body 6 and then through the opening 14b of the conical portion 7 of the valve body 6, and finally going through the opening 15c of the recess 9 of the valve seat 8 into the fluid passage 13. in this state, the fluid passages and openings involved are positioned relative to each other, as shown in FIG. 6.

Then, the drive spindle 4 for the valve body 6 is rotated into the state as shown by FIG. 7 (b), all of the openings 15a, 15b, 15c on the upwardly slanted surface of the recess 9 of the valve seat 8 are now brought into touch with the downwardly slanted surface of the conical portion 7. Thus, the fluid that flows into the valve seat 8 through any of the fluid passages 11, 12 and 13 will be blocked at each of the locations where each of the respective openings 15a, 15b, 15c are facing and contacting with the slanted surface of the conical portion 7. Then, the drive spindle 4 for the valve body 6 is further rotated into the state shown in FIG. 7 (c), the fluid that comes into the valve seat 8 through the fluid passage 13 will go through the opening 15c and the opening 14a into the fluid passage 26, and then through the opening 14b and the opening 15b into the fluid passage 12.

FIGS. 7 (d) and FIG. 7 (i) show the states, respectively, in which the flow of the fluid (molten metal) is now blocked similarly to the state as shown in FIG. 7 (b).

The state as shown in FIG. 7 (e) corresponds to the state in which the fluid that comes into the valve seat 8 through the fluid passage 11 will go through the opening 15a and the opening 14b into the fluid passage 26 and then through the opening 14a and the opening 15b into the fluid passage 12.

In this way, the flow of the fluid (molten metal) may be blocked and/or the direction in which the fluid is to flow may be controlled.

Although FIG. 7 (a) to FIG. 7 (f) show the case in which the valve body 6 is always rotated counterclockwise, the drive spindle 4 may be driven by rotating the rotary handle 5 either clockwise or counterclockwise as shown by a double arrow 16 (FIG. 1). Thus, the direction in which the valve body 6 is to be rotated is not limited to the counterclockwise direction as shown in FIG. 7 (a) to FIG. 7 (f).

Also the direction in which the fluid (molten metal) is to flow is not limited to those shown by arrows expressed in the lower of FIG. 7 (a), FIG. 7 (c) and FIG. 7 (e), rather it may be reversed.

In the foregoing description, in the states shown in FIG. 7 (b), FIG. 7 (c) and FIG. 7 (f), that is, when the flow of the fluid (molten metal) is blocked, all of the openings 15a, 15b, 15c on the upwardly slanted surface of the recess 9 of the valve seat 8 are in touch with the downwardly slanted surface of the conical portion 7 of the valve body 6, and the valve body 6 is pressed toward the valve seat 8 in the direction of an arrow 15 under the action of the spring 25 so that the downwardly slanted surface of the conical portion 7 can engage the upwardly slanted surface of the recess 9 under the applied pressure. Thus, the fluid that comes into the valve seat 8 through any of the fluid passages 11, 12, 13 may be blocked at the respective openings 15a, 15b, 15c which are formed on the upwardly slanted surface of the recess 9 so as to be facing and contacting with the downwardly slanted surface of the conical portion 7, thereby any part of the fluid (molten metal) is thus prevented from entering the space between the recess 9 and conical portion 7 that engage each respective slanted surfaces. As such, there is no risk that the surface (slanted surface) of the recess 9 and the surface (slanted surface) of the conical portion 7, which engage each other, would be damaged, which might occur when any part of the fluid (molten metal) enters the space between the two surfaces and when one surface is moved slidably relative to the other.

If any damage occurs on either or both of the surfaces (slanted surfaces) engaging each other, this would not be a problem since the downwardly slanted surface of the conical portion 7 engages the upwardly slanted surface of the recess 9 tightly under the applied pressure.

As described, the openings 15a, 15b, 15c for the fluid passages 11, 12, 13 are provided on the upwardly slanted surface of the recess 9, while the openings 14a, 14b that allow the openings 15a, 15b, 15c to communicate with each other through the fluid passage 26 within the valve body 6 are provided on the downwardly slanted surface of the conical portion 7. And those slanted surfaces engage each other under the applied pressure, any part of the fluid (molten metal) is prevented from entering the space between the two surfaces when the valve body 6 slides relative to the valve seat 8.

To permit this to occur, the slanted surfaces should preferably have a particular angle of inclination. Specifically, the results of the experiment effected by the inventor show that it is preferred that the slanted surface for the conical portion 7 and the slanted surface for the recess 9 should have an angle of inclination "E" expressed in FIG. 5 that is equal to between 30 degrees and 60 degrees. If the angle "E" is less than 30 degrees or more than 60 degrees, the fluid (molten metal) may undesirably be allowed to enter the space between those slanted surfaces of the conical portion 7 of valve body 6 and the recess 9 of valve seat.

According to the valve device of the present invention, all of the fluid passages 11, 12, 13 may preferably be provided so that they can have a down slope from the valve device (valve body 6 and valve seat 8) toward the outside thereof, as shown in FIG. 1. In this way, when the flow of the molten metal that occurs from the blast furnace or its holding furnace into the valve device (valve body 6 and valve seat 8) is suspended, the part of the molten metal that has reached the valve device (valve body 6 and valve seat 8) at that time is allowed to flow out of the valve device (valve body 6 and valve seat 8) along the down-slope fluid passages. Thus, no part of the molten metal will be solidified and attached to the valve device (valve body 6 and valve seat 8).

It is also to be understood from the foregoing description that as the valve device (valve body 6 and valve seat 8) is heated by the fluid (molten metal) when it is flowing through the valve device (valve body 6 and valve seat 8), as shown in FIG. 7 (a), FIG. 7 (c), and FIG. 7 (e), no metal will solidifying and attach to the valve device (valve body 6 and valve seat 8).

Furthermore, as it is known in the prior art although it is not shown, either of the valve body 6 and valve seat 8 may be altered to contain a built-in (buried) heater element that keeps the valve device (valve body 6 and valve seat 8) hot. This prevents any metal from being solidifying and attaching to the valve device (valve body 6 and valve seat 8), even when the flow of the fluid (molten metal) is blocked as shown in FIG. 7 (b), FIG. 7 (d), and FIG. 7 (f).

In the embodiment described above, the valve device has the construction such that the slanted surface of the recess 9 of the valve seat 8 has three openings (15a, 15b, 15c) spaced at regular intervals, while the slanted surface of the conical portion 7 of the valve body 6 has two openings (14a, 14b). This construction is provided to allow the fluid (molten metal) that comes into the valve device (valve body 6 and valve seat 8) through any of the fluid passages 11, 12, 13 to selectively flow through either of the two remaining fluid passages. It is noted, however, that the number of openings is not limited to the number described. For example, the valve seat may have four openings and four fluid passages may be provided while the valve body may have two openings. In this variation, the fluid (molten metal) that comes into the valve device (valve body 6 and valve seat 8) through any one of those four fluid passages may be allowed to flow through any one of the remaining fluid passages. As another example, the valve seat may have four openings and four fluid passages while the valve body may have three openings. In this variation, the fluid (molten metal) that comes into the valve device (valve body 6 and valve seat 8) through any one of those four fluid passages may be allowed to flow through any two of the remaining fluid passages.

In short, the valve body that has any particular number of openings may be combined with the valve seat that has the number of openings that is at least one more than the number of openings provided in the valve body.

Furthermore, the angles of center A, A1, A2, etc. between any two adjacent openings in the valve body, the angles of center B, C, D, etc. between any two adjacent openings on the valve seat, and the distance from the center of the circle to each respective opening 14a, 14b, etc. and each respective opening 15a, 15b, 15c, etc. may be adjusted as appropriate. Furthermore, which of the openings 14a, 14b, etc. should communicate with each other by means of the fluid passages 26, etc. through the valve body may be adjusted. By making those adjustments, the direction in which the fluid (molten metal) should flow may be varied flexibly.

Figure 8:
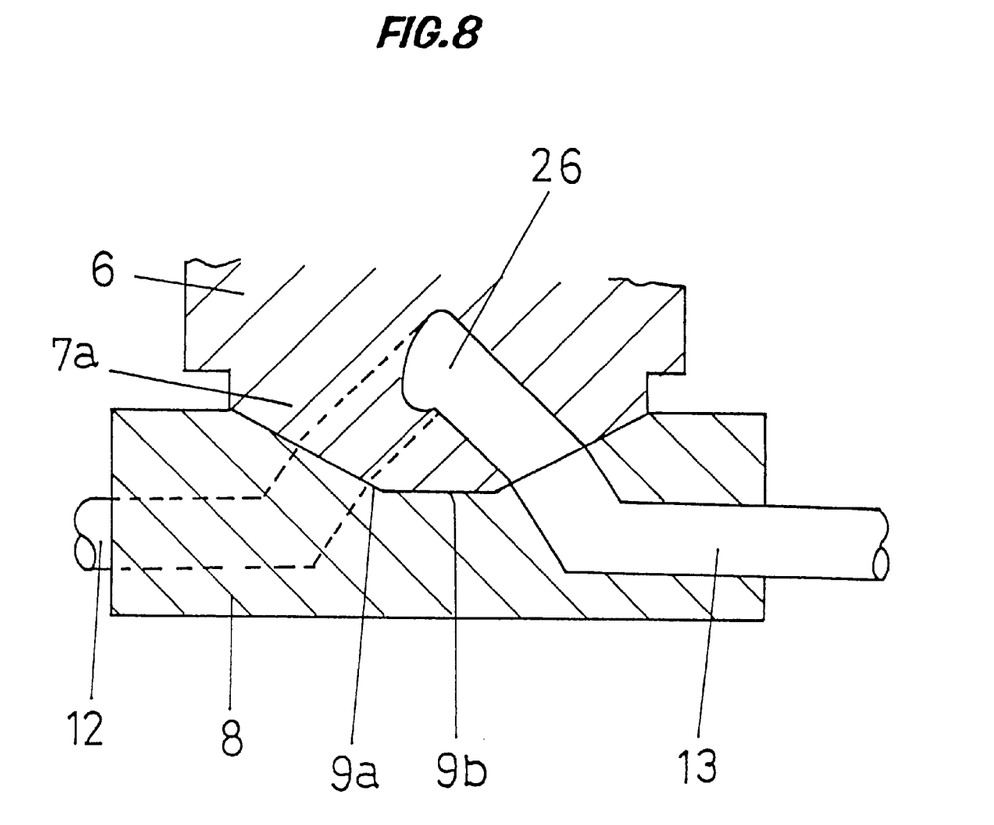
FIG. 8 is a sectional view of a valve device according to another embodiment of the present invention, showing how the valve body and the valve seat engage each other.

In the embodiment described above, the valve body 6 includes the conically formed portion (simply named conical portion 7) at its front end, and the valve seat 8 includes the recess 9 that matches the conical portion 7 of the valve body 6. In short, the requirements can be met by allowing the slanted surface having the openings on the conical portion 7 to engage the slanted surface having the openings on the recess 9 under the applied pressure so that the fluid passage within the valve body 6 can selectively communicate with any one or ones of the fluid passages within the valve seat 8 through those openings. Thus, as shown in FIG. 8, the valve body 6 may include a frustoconically formed portion 7a at its front end, and the valve seat 8 may include recesses 9a, 9b that may match the frustoconical portion 7a of the valve body 6. Alternatively, one may have a curved convex surface whereas the other may have a curved concave surface that and may match the curved convex surface may be used as the valve body and valve seat.

It should be understood that any construction of the valve device including the valve body and the valve seat slidably engaging with each other under the applied pressure by the each respective slanted surfaces each which has openings on the slanted surfaces for communicating a fluid passage within the valve body and fluid passages within the valve seat should fall within the spirit and scope of the present invention.

In the embodiment described above, the valve seat 8 is mounted immovably in its fixed position, while the valve body 6 is mounted rotatably and slidably against the valve seat 8. Conversely, the valve body 6 may be mounted immovably in its fixed position, while the valve seat 8 may be mounted rotatably so that it can be pulled closer toward the valve body 6 so as to be in touch with the same.

In the embodiment described above, the spring 25 is used to press the valve body 6 toward the valve seat 8, thereby forcing the valve body to engage the valve seat under the applied pressure. It is noted that any other elastic elements that perform the same function as the spring may be used. Alternatively, either of the valve body and valve seat may be mounted movably while the other may be mounted immovably in its fixed position, wherein the one (valve body or valve seat) may be provided not only to apply the pressure against the other, but also to be pulled toward the other (valve seat or valve body), and the spring or any other elastic element may be used to provide the pulling force. Any known cylinder device may be employed for the above purpose, as long as it can provide both the pressure force and the pulling force.

The rotary handle 5 in the above described embodiment may be operated manually, or may be operated automatically by connecting it to any drive means such as a reversible motor so that it can rotate forwardly or reversely. The time period during which the flow can occur, or the time intervals, at which the flow should occur, may be adjusted finely by controlling the rotary speed of the motor. In addition, for example, a limit switch or like (not shown) may be utilized to adjust the angle of rotation so that the opening 14a on the valve body 6 can be aligned with the opening 15a on the valve seat 8 in the half-open state, rather than in the fully-open state. In this way, fine adjustments of the rate of the flow may be made.

In the embodiment described above, the valve body 6 and the valve seat 8 may be made of any fire-resistant ceramic material by molding, for example. Such fire-resistant ceramic materials may include nitrides, such as silicon nitride like Si3N4, boron nitride (BN), or polycrystals of BN produced by the vapor growth method.

Although the present invention has been described with reference to the particular embodiments thereof, it should be understood that various changes and modifications might be made without departing from the spirit and scope of the invention as defined in the appended claims.

What is claimed is:

1. A valve device for controlling the flow of molten metal, said valve device having a valve body and a valve seat for receiving said valve body, wherein said valve body and said valve seat engage each other under an applied pressure and are capable of sliding relative to each other, said valve body comprising:
 a slanted surface formed on one end of said valve body, said slanted surface having a plurality of openings and an angle of inclination that is between 30 degrees to 60 degrees relative to a central axis of said valve body; and
 at least one fluid passage formed in the one end of said valve body, said fluid passage extending between two of said openings, said valve seat comprising:
 a slanted surface formed on said valve seat, said valve seat having a plurality of openings formed therein and an angle of inclination that is between 30 degrees to 60 degrees relative to the central axis of said valve body; and
 a plurality of fluid passages formed within and though said valve seat, said fluid passages communicating with said plurality of valve seat openings, respectively, wherein said valve seat can be selectively aligned with said valve body openings by sliding said valve seat and said valve body relative to each other with the slanted surface of the valve seat and the slanted surface of said valve body engaging each other under the applied pressure.

2. The valve device as claimed in claim 1, wherein at least a portion of each of said fluid passages, within said valve seat, slopes downwardly from said slanted surface of said valve seat toward the outside thereof.

3. The valve device as claimed in claim 1, wherein said valve body and said valve seat are formed of a fire-resistant ceramic material.

4. The valve device as claimed in claim 1, wherein said valve body and said valve seat are formed of silicon nitride or boron nitride.

5. The valve device as claimed in claim 1, further comprising a spring for applying pressure to said valve body in a direction of engagement with said valve seat.

6. A valve device comprising:
 a valve body having a central axis and including a slanted surface formed on an end portion of said valve body, and at least one fluid passage extending between openings formed in said slanted surface of said valve body,
 wherein said slanted surface of said valve body has an angle of inclination that is between 30 degrees to 60 degrees relative to the central axis of said valve body;
 a valve seat having a slanted surface in slidable engagement with said valve body, and at least two fluid passages communicating with openings formed in said slanted surface, respectively,
 wherein said slanted surface of said valve seat has an angle of inclination that is between 30 degrees to 60 degrees relative to the central axis of said valve body; and
 a force applying device for applying a force to said valve body such that said slanted surface of said valve body is held in contact with said slanted surface of said valve seat under the applied force,
 wherein a fluid that flows to the valve device through any one of said fluid passages of said valve seat may selectively be connected with another of said fluid passages of said valve seat by relative movement of said valve body to align said fluid passage extending through said valve body with the selected ones of said fluid passages of said valve seat, thereby allowing the fluid to flow from the valve device in a different direction relative to that which the fluid flowed to the valve device.

7. The valve device as claimed in claim 6, wherein each of said fluid passages, formed in said valve seat, slopes downwardly from said valve seat toward the outside thereof.

8. The valve device as claimed in claim 6, wherein said valve body and said valve seat are formed of a fire-resistant ceramic material.

9. The valve device as claimed in claim 6, wherein said valve body and said valve seat are formed of silicon nitride or boron nitride.

10. The valve device as claimed in claim 6, wherein said force apply device comprising a spring.

11. A valve assembly comprising:

a valve seat and a valve body slidably engaged with said valve seat, said valve body and said valve seat engaging each other under an applied pressure, said valve body including a conical portion formed on one end of said valve body and having a plurality of openings spaced at regular intervals, and a fluid passage provided within and through the said valve body for communicating at least two or more of said plurality of openings with each other, said valve seat including:

a recess for receiving said conical portion of said valve body, said recess having a plurality of openings spaced at regular intervals around said recess, wherein the number of said openings in said recess is greater than the number of said openings in said conical portion of said valve body; and a plurality of fluid passages formed within and through said valve seat, said fluid passages communicating with said openings in said recess, respectively, wherein said conical portion of said valve body and said recess of said valve seat each define surfaces that are inclined at an angle of 30 to 60 degrees relative to a central axis of said valve body.

12. The valve assembly as claimed in claim 11, wherein said plurality of fluid passages within said valve seat are sloped so that fluid contained therein can drain from said recess toward the outside of said valve seat.

13. The valve assembly as claimed in claim 11, wherein said fluid passage within said valve seat slopes downwardly from said valve seat toward the outside thereof.

14. The valve assembly as claimed in claim 11, wherein said valve body and said valve seat are formed of a fire-resistant ceramic material.

15. The valve assembly as claimed in claim 11, wherein said valve body and said valve seat are formed of silicon nitride or boron nitride.

16. The valve assembly as claimed in claim 11, further comprising a spring for biasing said valve body into engagement with said valve seat.

17. The valve assembly as claimed in claim 11, further comprising:

a housing enclosing said valve body and said valve seat;

a heat insulating material provided in said housing; and a rotary handle disposed outside of said housing and connected to said valve body.

* * * * *